Patented Nov. 10, 1953

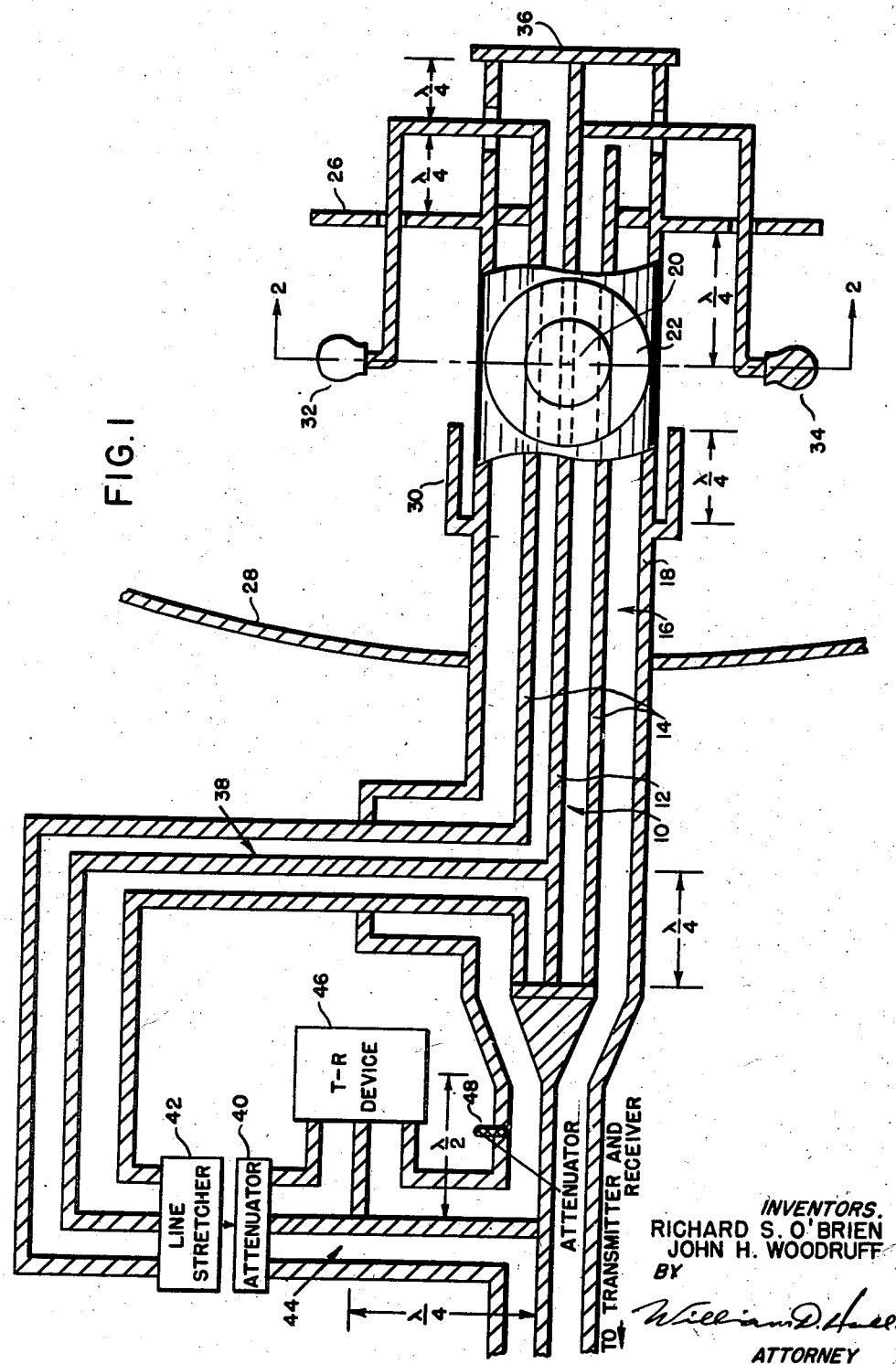

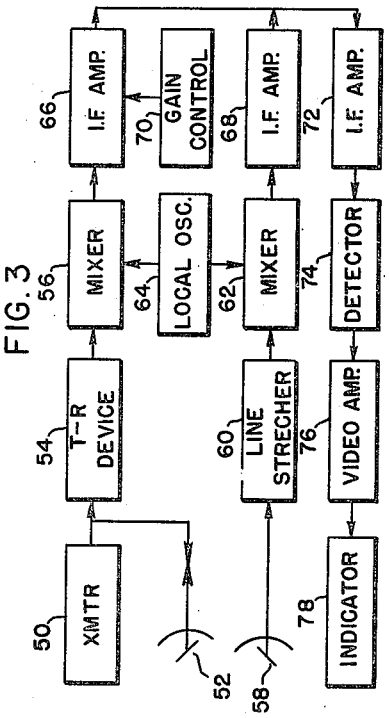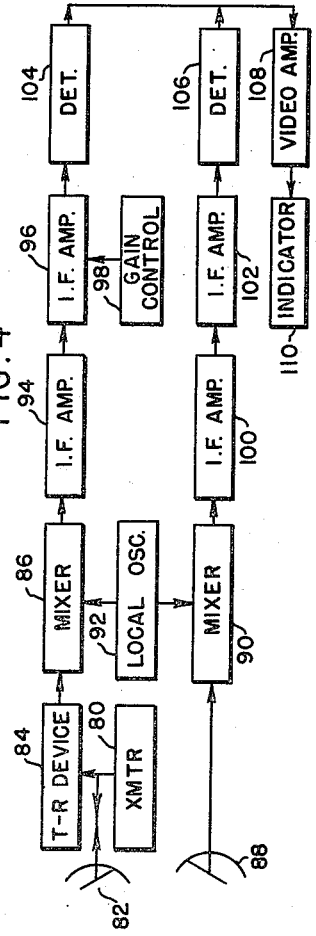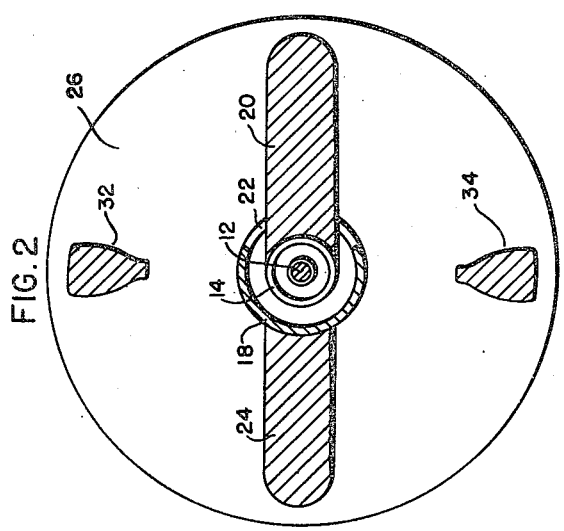

2,658,991

UNITED STATES PATENT OFFICE 2,658,991

ANTIJAMMING RADAR SYSTEM

Richard S. O'Brien, Tarrytown, and John H. Woodruff, Auburn, N. Y., assignors to United States of America as represented by the Secretary of War Application May 8, 1946, Serial No. 668,150

5 Claims. (Cl. 250—13)

This invention relates to electrical apparatus, and more specifically to apparatus for and methods of eliminating interference due to circularly and elliptically polarized electromagnetic waves.

Radio object locating systems in extensive use employ antennae adapted to receive and transmit plane polarized waves. The wave may be vertically or horizontally polarized, or may have a fixed polarization which is intermediate between vertical or horizontal polarization. Another type of plane polarization which is commonly used in radio object locating systems is that which results from conical scanning. In this instance, the polarization is varied in a cyclic manner, but for any selected transmitted and received signal the polarization is substantially fixed.

Because of the many polarization directions possible, stations designed to cause interference on radio object locating systems transmit signals having all of these polarizations. This is often accomplished by transmission of circularly or elliptically polarized waves. A circularly polarized wave produces the same signal intensity on a plane polarized receiving antenna as does a signal having the same amplitude of electric field vector which has a polarization which is identical to the polarization of the receiving antenna. Such interfering circularly or elliptically polarized waves are therefore particularly effective and have heretofore been difficult to eliminate, for they cannot be circumvented by a change in the polarization of the antenna associated with the radio object locating system.

It is an object of the present invention, therefore, to provide methods whereby circularly and elliptically polarized signals are eliminated without preventing desired plane polarized signals from reaching the indicator of the radio object locating system.

It is a further object of the present invention to provide apparatus wherein circularly and elliptically polarized signals are eliminated without preventing desired plane polarized signals from reaching the indicator of the radio object locating system.

For a better understanding of the methods and apparatus involved in the present invention, reference is had to the following description which is to be read in connection with the accompanying drawings in which:

Fig. 1 is a cross-sectional view of a part of the radio frequency portion of a radio object locating system employing one embodiment of the present invention;

Fig. 2 is a sectional view of a portion of the apparatus of Fig. 1 taken along the line 2—2;

Fig. 3 is a block diagram of a radio object locating system employing a second embodiment of the present invention; and, Fig. 4 is a block diagram of a radio object locating system employing a third embodiment of the present invention.

Reference is now had to the drawings and more particularly to Figs. 1 and 2 thereof wherein there is shown a part of the radio frequency portion of a radio object locating system comprising a section of coaxial transmission line 10 having an inner conductor 12 and an outer conductor 14. The outer conductor 14 of the line 10 forms the inner conductor of a coaxial line 16 having an outer conductor 18. One element 20 of a dipole is connected to the inner conductor 14 of the line 16 and extends through an opening 22 in the conductor 18. The remaining element 24 of the dipole, visible only in Fig. 2, is connected to the conductor 18. A metallic reflecting element 26 is connected to the conductor 18 approximately one-fourth wavelength from the center line of the dipole elements 20 and 24. A reflector 28 which may be of parabolic or similar type is also connected to the conductor 18. Interposed between the center line of the dipole elements 20 and 24 and the reflector 28 is a sleeve 30 which is connected to the conductor 18 at the end nearest the reflector 28. The sleeve 30 is approximately one-fourth wavelength long and here functions to prevent radio frequency energy from being conducted along the outer surface of conductor 18. A second dipole lying in a plane passing through the axis of transmission line 10 and perpendicular to the center line of dipole elements 20 and 24, is formed by the knob-like elements 32 and 34 which are respectively connected to the outer and inner conductors of the coaxial transmission line 10. The connections from the elements 32 and 34 to the line 10 are made approximately one-fourth wavelength from reflecting element 26 on the side opposite dipole elements 20 and 24. The conductor 12 is supported by its junction with an end plate 36 which is connected to the conductor 18. This junction between the conductor 12 and the end plate 36 is made approximately one-four wavelength from the connections to the dipole formed by elements 32 and 34. The other end of line 10 is short-circuited as shown. The transmission line 10 makes a T-junction with a section of coaxial line 38 at a point on the side of reflector 28 opposite the reflector 26. The T-junction is made approximately one-fourth wavelength from the short-circuited end of line 10. The transmission line 38 is connected to an attenuator 40 through a line stretcher 42 which may be a variable length of transmission line. The position of the attenuator 40 in the line 38 is immaterial. The attenuator 40 may be any structure capable of absorbing energy and is preferably variable in nature. The output of the attenuator is connected by a section of coaxial line 44 through a T-junction to the transmission line 16. A transmit-receive (T-R) device 46 is connected by a suitable section of transmission line to the transmission line 44. The T-R device 46 is essentially an amplitude discriminator which provides a short-circuit for signals having amplitudes greater than a predetermined value. The T-R device 46 is displaced from the transmission line 44 by an electrical distance of approximately one-half wavelength. The junction of the transmission line associated with the T-R device 46 and the transmission line 44 is spaced from the junction of the transmission lines 16 and 44 by an odd number of quarter-wavelengths. An attenuator 48 which is preferably variable in nature is inserted in the transmission line 16 intermediate its junction with transmission line 44 and the antenna formed by elements 20 and 24. The transmission line 16 connects to the receiver and transmitter of a radio object locating system, not shown.

In the operation of the apparatus of Figs. 1 and 2, energy from the transmitter is conducted along the transmission line 16. This energy will not divide at the junction of line 16 with line 44, due to the location and action of the T-R device 46 and therefore none of this transmitter energy is transferred through the line 44. Substantially all of the energy from the transmitter is thus transferred through the transmission line 16 to the radiating antenna comprising elements 20 and 24. The energy from the transmitter is therefore transmitted as a plane polarized wave having a polarization which is dependent upon the orientation of the antenna comprising elements 20 and 24. Signals which are returned from reflecting objects will be plane polarized waves and will normally not have suffered any change in the direction of polarization. These returned signals are therefore picked up by the elements 20 and 24 and transferred through the line 16 to the receiver. Due to the direction of polarization of the returned signal no signal will be picked up by the elements 32 and 34.

A circularly polarized wave received from an interfering station will excite two component signals on elements 20 and 24 and on elements 32 and 34 in substantially equal magnitudes. When the interference signal is elliptically polarized, the magnitudes of the signals impressed on the elements 20 and 24 and on the elements 32 and 34 will in general be different. Interference signals received by the elements 32 and 34 are transferred through the transmission lines 20 and 38 to the line stretcher 42 and thence through the attenuator 40 to the junction of lines 16 and 44, are there combined with interference signals received by the elements 20 and 24. Due to the 90 degree physical displacement between the receiving antenna comprising elements 20 and 24 and the receiving antenna comprising elements 32 and 34, the signals impressed upon these two antennae are 90 degrees out of phase. The line stretcher 42 is so adjusted that the signal from the elements 32 and 34 are shifted in phase by an odd number of quarter wavelengths before being combined with the signals received by the elements 20 and 24. This odd number of quarter-wavelengths phase shift plus the 90 degree phase difference due to the physical displacement of the antennae cause the two components of the interference signal to interfere destructively or cancel at the junction of the lines 16 and 44. The amplitudes of the two interference signal components are adjusted by means of the attenuators 40 and 48, so that the signals may be made equal in amplitude at the junction of the transmission lines 16 and 44. This adjustment therefore enables elimination of either circularly or elliptically polarized interfering signals.

Reference is now had to Fig. 3 which illustrates in block diagram form a radio object locating system employing a second embodiment of the present invention, comprising a transmitter 50 connected to an antenna 52. The antenna 52 is designed to radiate and receive plane polarized waves having a fixed direction of polarization. The transmitter 50 and antenna 52 are connected through a T-R device 54 to a mixer circuit 56. Antenna 58, designed for reception of plane polarized waves having a direction of polarization which is at right angles to the direction of polarization of the antenna 52, is connected through a line stretcher 60 to a mixer 62. A local oscillator 64 feeds signals to the mixers 56 and 62. The output of the mixers 56 and 62 are respectively connected to intermediate frequency amplifiers 66 and 68, amplifier 66 having a gain control 70. The outputs of the intermediate frequency amplifiers 66 and 68 are combined and applied to the intermediate frequency amplifier 72, and thence through a detector 74 and a video amplifier 76 to a conventional cathode ray tube indicator 78.

The principle of operation of the apparatus illustrated in block diagram form in Fig. 3 is similar to that of the apparatus previously described, in that two mutually perpendicular components of the circularly or elliptically polarized interference wave are derived and caused to destructively interfere or cancel. In the apparatus illustrated in Fig. 3, the two mutually perpendicular components of the interference signal are received by the separate antennae 52 and 58, and are applied to separate mixers 56 and 62 which have a common local oscillator 64 connected thereto. The outputs of mixers 56 and 62 are applied to individual intermediate frequency amplifiers. As in the first described embodiment, the signals received by the antennae 52 and 58 are in phase quadrature and, therefore, the intermediate frequency signals present at the common output of the intermediate frequency amplifiers 66 and 68 are normally also in phase quadrature. The signal received by the antenna 58 is, however, shifted an odd number of quarter-wavelengths in phase by the line stretcher 60, causing the intermediate frequency signals present at the common output of the intermediate frequency amplifiers 66 and 68 to be in 180 degree phase opposition. Due to possible differences in gain of the antennae 52 and 58, of the mixers 56 and 62 and of the intermediate frequency amplifiers 66 and 68, the amplitude of the signals at the output of the amplifiers 66 and 68 are not generally equal even when it is a circularly polarized interference wave which is received. The gain control 70 is therefore provided to adjust these signals to equal amplitude, so that complete cancellation may be achieved for both circularly polarized and elliptically polarized interference waves.

Reference is now had to Fig. 4 of the drawings which illustrates in block diagram form a radio object locating system employing a third embodiment of the present invention, comprising a transmitter 80 connected to an antenna 82 and a T-R device 84. The antenna 82 is similar in structure and function to the antenna 52, Fig. 3. The T-R device 84 is connected to a mixer 86. An antenna 88 which is similar in construction and function to the antenna 58, Fig. 3, is connected to a mixer 90. A local oscillator 92 feeds signals to the mixers 86 and 90. The output of the mixer 86 is connected through an intermediate frequency amplifier 94 to an intermediate frequency amplifier 96 having a gain control 98. The output of the mixer 90 is connected through an intermediate frequency amplifier 100 to an intermediate frequency amplifier 102. The outputs of the amplifiers 96 and 102 are respectively connected to detectors 104 and 106 which have a common output applied to a video amplifier 108. The output of video amplifier 108 is applied to an indicator 110.

The operation of the apparatus of Fig. 4 differs from the operation of the apparatus of Fig. 3 essentially in that cancellation of the interference signal components is achieved in the video rather than in the intermediate frequency circuits. Mutually perpendicular components of the circularly or elliptically polarized interference waves are received by separate antennas 82 and 88. These signals are applied to individual mixers 86 and 90, and the resulting intermediate frequency signals are individually applied to amplifier 94 and 100, respectively, and thence to amplifiers 96 and 102, respectively. The detectors 104 and 106 to which signals from amplifiers 96 and 102 are applied, respectively, are designed to provide output signals which are of opposite polarity. Thus, for an interference signal which is circularly polarized, assuming the overall gain of the apparatus in the two channels from the antenna 82 to the detector 104 and from the antenna 88 to the detector 106 to be equal, the outputs from the detectors 104 and 106 are of equal amplitude and opposite in polarity and therefore cancel each other. The gain control 98 associated with the amplifier 96 permits compensation for inequality of the overall gains of the above-mentioned two channels, and thus also functions for cancellation of the two components of an elliptically polarized interference signal.

To summarize, the basic method herein disclosed, for the elimination of circularly and elliptically polarized electromagnetic interference waves in a radio system normally employing plane polarization, consists of deriving two mutually perpendicular components of the interference signal, adjusting the phase and amplitude of the two components, and combining them destructively. In the described embodiments, cancellation of the undesired signal components take place in the radio frequency, intermediate frequency and video circuit section respectively of the radio system.

While there has been described what is at present considered the preferred embodiments of the present invention it will be obvious to those skilled in the art that various changes and modifications may be made therein without departing from the scope of the present invention.

What is claimed is:

1. In combination with a radio system employing a linearly polarized first antenna and means for coupling said first antenna to both a transmitter and a receiver and a first means for adjusting the magnitude of waves received by said first antenna, apparatus for causing the elimination of interference signals resulting from circularly and elliptically polarized electromagnetic waves, said apparatus comprising a second antenna for receiving a linearly polarized electromagnetic wave having a direction of polarization substantially at right angles to the direction of polarization of said first antenna, first and second mixing means communicating respectively with said coupling means and said second antenna and adapted to respectively provide first and second intermediate frequency signals, first and second amplifiers adapted to amplify the output of said first and second mixing means, first and second detecting means respectively connected to said first and second amplifier means and adapted to provide output signals of opposite polarity, means for combining the outputs of said first and second detecting means to eliminate interference signals resulting from circularly and elliptically polarized waves, and an amplitude discriminating device between said first mixing means and said coupling means for blocking the transmitter signals from said first mixing means.

2. A radio system for the transmission and reception of linearly polarized electromagnetic waves and for the elimination of circularly or elliptically polarized interference signals comprising a receiver, a transmitter, a first antenna adapted to transmit and receive linearly polarized waves, means for coupling said first antenna to both the transmitter and receiver, a first channel coupled to said first antenna, first means in said first channel for adjusting the magnitude of waves received by said first antenna and supplied to said first channel, a second antenna adapted to receive linearly polarized waves having a direction of polarization substantially at right angles to the direction of polarization of waves from said first antenna, second channel coupled to said second antenna, means in said second channel for shifting the phase of waves received by said second antenna and supplied to said second channel, second means in said second channel for adjusting the magnitude of said waves supplied to said second channel, means coupling together the outputs of said first and second channels for eliminating circularly or elliptically polarized signals, components of which are received by both said antennas, and an amplitude discriminating device between said second antenna and said means for coupling said first antenna to the transmitter for blocking the transmitter signals from said second antenna.

3. A radio system for the transmission and reception of linearly polarized electromagnetic waves and for the elimination of circularly or elliptically polarized interference signals comprising first and second dipole antennas mounted perpendicularly with respect to one another, a parabolic reflector mounted in operative relation with respect to both said dipole antennas, a first coaxial transmission line having its conductors coupled respectively to the arms of said first dipole antenna for coupling said first antenna to both a transmitter and a receiver, a second coaxial transmission line mounted concentrically with respect to said first line and having its conductors coupled respectively to the arms of said second dipole antenna, said lines extending through said reflector, first attenuating means in said first line, second attenuating means in said second line, means in said second line for adjusting the length thereof, and an amplitude discriminating device in said second line adapted to block transmitter signals from said second antenna.

4. A radar system for transmitting and receiving linearly polarized waves comprising a transmitter, a receiver, a first antenna for receiving and radiating plane polarized waves, means coupling said antenna to said transmitter and receiver, a second linear antenna for receiving radiant energy polarized in a plane perpendicular to the plane of the energy received by said first antenna, means for connecting said second antenna to said receiver and for blocking the output of said transmitter from said second antenna, means for shifting the phase of the signals received by one antenna with respect to the signals received by the other antenna, and means for differentially combining the signals received by said first and second antennas.

5. An anti-jamming radar system comprising a first dipole, a first coaxial transmission line coupled thereto, a second dipole perpendicularly disposed with respect to said first dipole, a second coaxial transmission line coupled to said second dipole, the outer conductor of said first transmission line forming the inner conductor of said second transmission line and the outer conductor of said second transmission line being coaxial with said inner conductor, a conductor terminating said first transmission line connected to both the inner and outer conductors of said first transmission line at a predetermined distance from said first antenna, a third coaxial transmission line connected to said first transmission line, the inner conductor of said third transmission line being joined to the inner conductor of said first transmission line at a distance back of said conductor terminating said first transmission line equivalent to a quarter wavelength at the operating frequency of said radar system, means in said third transmission line for adjusting the length thereof, adjustable means in said third transmission line for attenuating the energy received by said first antenna and supplied through said first transmission line to said third transmission line, adjustable means in said second transmission line for attenuating the energy received by said second antenna and supplied to said second transmission line, means interconnecting said third transmission line and said second transmission line, means coupling the output of the transmitter of said radar system to said second and third transmission lines at the junction thereof, means coupled to said third transmission line for preventing the output of said transmitter from being transmitted through said third transmission line, and the receiver of said radar system being coupled to said second and third transmission lines at the junction thereof.

RICHARD S. O'BRIEN.
JOHN H. WOODRUFF.

References Cited in the file of this patent
UNITED STATES PATENTS

| Number | Name | Date |
|---|---|---|
| 2,251,530 | Thorne | Aug. 5, 1941 |
| 2,271,909 | Beverage | Feb. 3, 1942 |
| 2,273,161 | Usselman | Feb. 17, 1942 |
| 2,312,799 | Carter | Mar. 2, 1943 |
| 2,350,331 | Salenger | June 6, 1944 |
| 2,394,544 | Gottier | Feb. 12, 1946 |
| 2,412,315 | Brown | Dec. 10, 1946 |
| 2,422,190 | Fiske | June 17, 1947 |
| 2,531,951 | Shamos et al. | Nov. 28, 1950 |